United States Patent [19]

Tanaka

[11] Patent Number: 5,139,327
[45] Date of Patent: Aug. 18, 1992

[54] VEHICLE FOLLOWING APPARATUS WITH A DISTANCE MEASURING FUNCTION

[75] Inventor: Shoichi Tanaka, Himeji, Japan

[73] Assignee: Mitsubishi Denki Kabushiki Kaisha, Tokyo, Japan

[21] Appl. No.: 755,947

[22] Filed: Sep. 6, 1991

[30] Foreign Application Priority Data

Sep. 10, 1990 [JP] Japan .................. 2-240940

[51] Int. Cl.$^5$ ............................................. H04N 7/18
[52] U.S. Cl. ........................................ 356/1; 356/4; 358/105; 358/126
[58] Field of Search ............... 356/1, 4; 358/105, 126

[56] References Cited

U.S. PATENT DOCUMENTS

| 4,635,203 | 1/1987 | Merchant ........................ 356/1 X |
| 4,988,189 | 1/1991 | Kroupa et al. ..................... 356/4 |
| 5,023,712 | 6/1991 | Kijiwara . |
| 5,026,153 | 6/1991 | Suzuki et al. ..................... 356/1 |

FOREIGN PATENT DOCUMENTS

| 60-33352 | 8/1985 | Japan . |
| 63-38085 | 7/1988 | Japan . |
| 63-46363 | 9/1988 | Japan . |

*Primary Examiner*—Mark Hellner
*Attorney, Agent, or Firm*—Sughrue, Mion, Zinn, Macpeak and Seas

[57] ABSTRACT

A vehicle following apparatus with a distance measuring function is provided in which once the driver roughly sets a vehicle following window on a display screen, the exact position and size of the window can be automatically adjusted so as to locate the image of a target preceding vehicle as sensed in the center of the window, and in which the distance to the target preceding vehicle can be successively measured in an exact manner while following the target vehicle. A pair of image sensors sense an object from two different points to form a pair of first and second images thereof. A window forming means defines a vehicle-following window of a variable size within the first images. A memory successively stores an image in the vehicle-following window. An image processor finds, from the first images at a current time, a new image which is the most similar to the image stored in the memory at a previous time. The image processor defines a provisional window containing therein the thus found new image. A controller not only calculates the distance to the preceding vehicle, but also adjusts the location of the provisional window to form a new window so that the new window thus formed contains the most number of horizontal lines. To this end, using the provisional window, differences between vertically adjacent image signals within the provisional window are summed up over the horizontal length of the provisional window to extract horizontal lines in the provisional window, so that the new window is defined based on a vertical position maximimizing the sum of the differences.

6 Claims, 3 Drawing Sheets

LEFT-HAND IMAGES ($t=t_0$)

RIGHT-HAND IMAGES ($t=t_1$)

WINDOW ADJUSTMENT

SUM OF DIFFERENCES BETWEEN VERTICALLY ADJACENT IMAGE SIGNALS WITHIN THE WINDOW OVER THE HORIZONTAL LENGTH THEREOF

↓ FORM NEW WINDOW $sI = a - b + o$
$rI = r + (sI - s)$

VEHICLE FOLLOWING APPARATUS WITH A DISTANCE MEASURING FUNCTION

BACKGROUND OF THE INVENTION

The present invention relates to a vehicle following apparatus with a distance measuring function which is able to continuously follow a preceding vehicle in an automatic fashion while successively measuring the distance to the preceding vehicle in an optical manner.

Some typical examples of distance measuring apparatuses are disclosed in Japanese Patent Publication Nos. 63-38085 and 63-46363. The apparatuses disclosed therein commonly have a pair of first and second parallel optical systems having two convex lenses 101, 102 disposed in a horizontally aligned relation at a prescribed distance L away from each other, as shown in FIG. 3. A pair of separate image sensors 103, 104 are horizontally disposed at focuses of the lenses 101, 102 apart their focal distance f from the locations of corresponding lenses 101, 102, respectively, for generating respective image signals to a common signal processor 120. The signal processor 120 successively shifts the image signals from the image sensors 103, 104 and electrically superposes them one over the other, so that the distance R from the lenses 101, 102 to an object 121 is calculated based on the principle of triangulation using the following formula:

$$R = (f \cdot L)/d$$

where d is a shift distance by which the image signals are moved to obtain the best match.

On the other hand, a typical method of following a preceding vehicle as sensed by an image sensor or the like is disclosed in Japanese Patent Publication No. 60-33352. In this method, for the purpose of following a target on a display screen, a driver has to set on the display screen a following gate or window which encloses the target to be followed, while looking at the screen.

With the conventional distance measuring apparatuses as described above in which the entire images as sensed by the right and left image sensors 101, 102 are compared with each other for measuring the distance to a preceding vehicle, it is rather difficult to accurately determine the image of the preceding vehicle among various images sensed by the image sensors 101, 102 and hence it is difficult to perform accurate distance detection due to great influences of the background images around the sensed vehicle image.

In addition, the background images around the image of the preceding vehicle are generally complicated and hence it is impossible to automatically discern and follow the preceding vehicle, so the driver is required to successively form a vehicle following window of a desired configuration on the screen of a display on a manual mode. Such an operation of the driver considerably reduces the safety in driving.

SUMMARY OF THE INVENTION

Accordingly, the present invention is intended to obviate the above-described problems of the conventional apparatuses.

An object of the invention is to provide a novel and improved vehicle following apparatus with a distance measuring function in which once the driver roughly sets a vehicle following window on a display screen, the exact position and size of the window can be automatically adjusted so as to locate the image of a target preceding vehicle as sensed in the center of the window, and in which the distance to the target preceding vehicle can be successively measured in an exact manner while following the target vehicle.

In order to achieve the above object, according to the present invention, there is provided a vehicle following apparatus with a distance measuring function comprising:

image sensor means for imaging an object from two different points to form a pair of first and second images thereof;

window forming means for defining a vehicle-following window of a variable size within the first images;

a memory for successively storing an image in the vehicle-following window;

an image processor for finding, from the first images at a current time, a new image which is the most similar to the image stored in the memory at a previous time, the image processor being operable to define a provisional window containing therein the thus found new image; and a controller for calculating the distance to the preceding vehicle based on the distance of shift by which the new image in the first images is shifted relative to a corresponding image in the second images to obtain the best match therebetween, the controller being operable to adjust the location of the provisional window to form a new window so that the new window thus formed contains the most number of horizontal lines.

Using the provisional window, differences between vertically adjacent image signals within the provisional window are summed up over the horizontal length of the provisional window to extract horizontal lines in the provisional window, so that the new window is defined based on a vertical position maximizing the sum of the differences.

In a preferred embodiment, a total sum $S_a$ of differences between vertically adjacent image signals $S_{n, a}$, $S_{n, a-1}$ within an upper half of the provisional window and a total sum $S_b$ of differences between vertically adjacent images $S_{n, b}$, $S_{n, b-1}$ within a lower half of the provisional window are calculated based on the following equations:

$$Sa = \sum_{n-P+k}^{P+k+r} (Sn, a - Sn, a - 1)$$

where $q+1+s/2 < a < q+1+s$.

$$Sb = \sum_{n-P+k}^{P+k+r} (Sn, b - Sn, b - 1)$$

where $q+1 < b < q+1+s2$.

Based on the difference between the value of a, which maximizes $S_a$, and the value of b, which maximizes $S_b$, the vertical length sI and the horizontal length rI of the new window are determined as follows:

$$sI = a - b + o$$

$$rI = r + (sI - s)$$

where o is an offset of the new window from the provisional window.

The new window of this size is freshly defined with the lower left-hand corner and the upper right-hand corner thereof being located at points (p+k, b−o/2) and (p+k+rl, a+o/2), respectively.

The above and other objects, features and advantages of the present invention will become more readily apparent from the following detailed description of a preferred embodiment thereof taken in conjunction with the accompanying drawings.

DESCRIPTION OF A PREFERRED EMBODIMENT

An embodiment of the present invention will now be described in detail with reference to the accompanying drawings.

Figure 1:
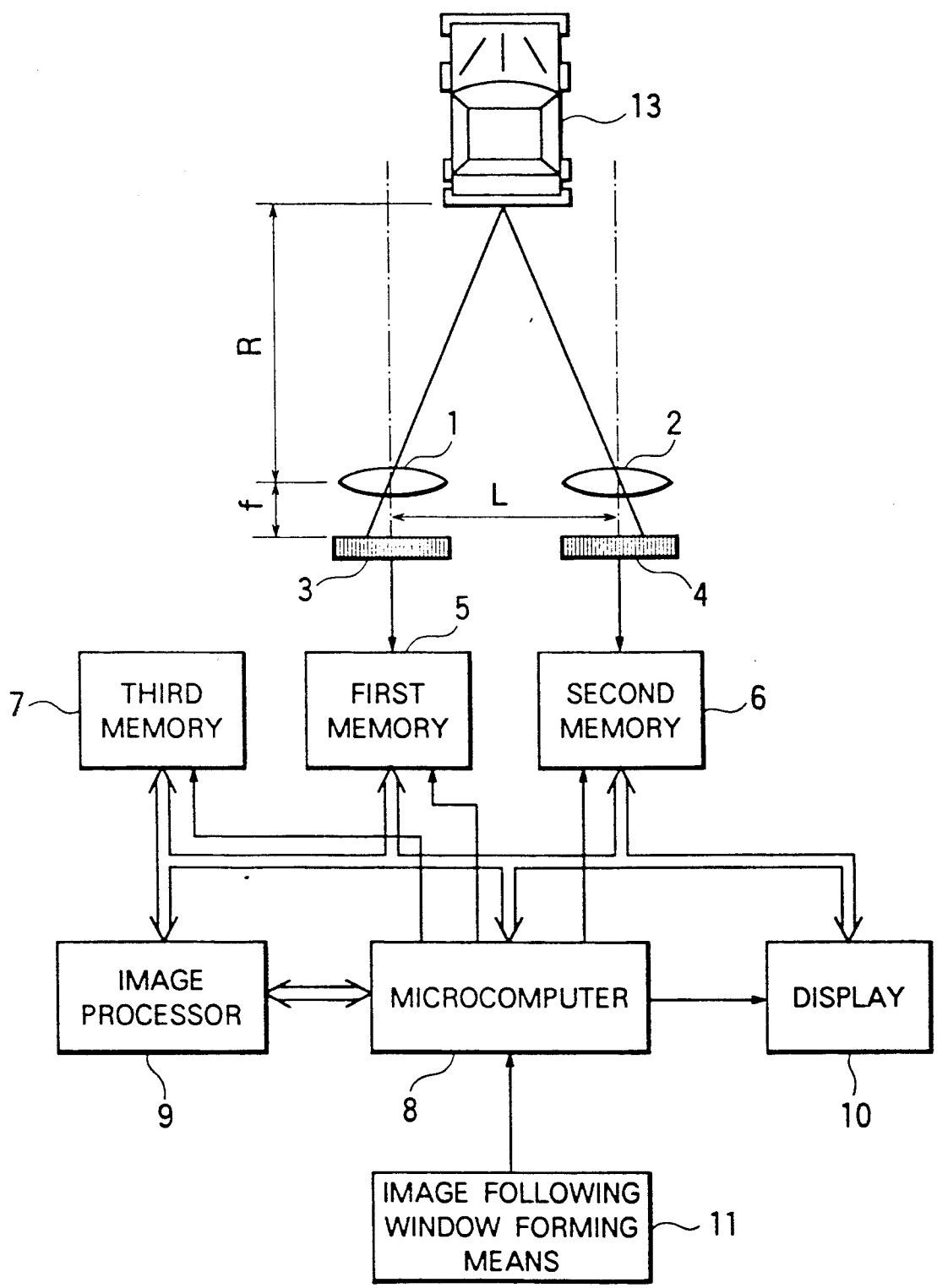
FIG. 1 is a schematic block diagram of a vehicle following apparatus with a distance measuring function in accordance with the present invention.

FIG. 1 illustrates the schematic construction of a vehicle following apparatus with a distance measuring function in accordance with the present invention. The apparatus illustrated includes a pair of first and second parallel optical systems having two convex lenses 1, 2 disposed in a horizontally aligned relation at a prescribed distance L away from each other, and a pair of separate first and second (or left-hand and right-hand) image sensors 3, 4 are horizontally disposed at focal points of the lenses 1, 2 at a distance f from the locations of corresponding lenses 1, 2, respectively, for generating respective image signals in analog form representative of a two-dimensional image to a pair of corresponding first and second memories 5, 6. A third memory 7 stores images transferred thereto via a bus from the first memory 5. An image processor 9 is connected to the first through third memories 5 through 7 and a controller 8 in the form of a microcomputer for image processing the data stored in the memories 5 through 7 under the control of the microcomputer 8. A display 10 with a screen is connected to the image processor 9 and the microcomputer 8 for displaying an image of a preceding vehicle 13 formed by the image processor 9 under the control of the microcomputer 8. An image-following window forming means 11 is connected to the microcomputer 8 for defining an image-following window on the screen of the display 10.

The operation of the above-described apparatus will now be described with particular reference to FIGS. 2(a) through (2e). First, an image of an object in the form of a preceding vehicle 13 to be followed is sensed by the image sensors 3, 4 and input to the first and second memories 5, 6. The image of the preceding vehicle 13 thus input is then transmitted from the memories 6, 7 to the display 10 where it is displayed on a screen of a CRT. On this occasion, the driver manipulates the image-following window forming means 11 to designate or instruct the location and size of an image following window to be formed on the display screen. The microcomputer 8 reads such instructions and makes the designated window to be formed on the display screen while designating corresponding addresses in the memories 5, 6.

Here, let us assume that the driver sets an appropriate image following window on the display screen at a point in time $t_0$ by means of the window forming means 9, so that the microcomputer 8 measures or calculates the distance to a target preceding vehicle. A procedure for defining the image following window is shown in FIGS. 2(a) through 2(e). For example, as shown in FIG. 2(a), the driver first manipulates the window forming means 11 so that a rectangular-shaped window 15 of a predetermined size or dimensions containing an image 16 of a preceding vehicle is roughly defined in the first or left-hand images sensed by the first or left-hand image sensor 5 with its lower left-hand corner and upper right-hand corner being positioned at locations (p, q) and (p+r, q+s), respectively, in the picture elements co-ordinate system. The microcomputer 8 stores the thus defined window 15 in the first memory 5 by allocating the above locations to corresponding addresses in the first memory 5.

Subsequently, a rectangular area of the same size as that of the window 15 as above stored in the first memory 5 is successively cut or taken out of the second or right-hand images sensed by the second or right-hand image sensor 6 in a search area 17 in the form of a horizontally extending band with a vertical length of from line (p) to line (p+r), as shown by hatching in FIG. 2(b), for comparing an image 18 therein with the image 16 of the preceding vehicle in the window 15 in the first memory 5. More specifically, assuming that image signals for the first or left-hand images are represented by $S_{i,j}$ and image signals for the second or right-hand images are represented by $SI_{i,j}$, a total sum $S_k$ of absolute values of differences between the corresponding signals for the first and second images $(S_{i,j} - SI_{i,j})$ is calculated by the image processor 9 as follows:

$$S_k = \sum_{j=q}^{q+s} \sum_{i=P}^{P+r} |S_{i,j} - SI_{i+k,j}| \qquad (1)$$

where k is a positive integer that successively varies from zero.

Figure 3:
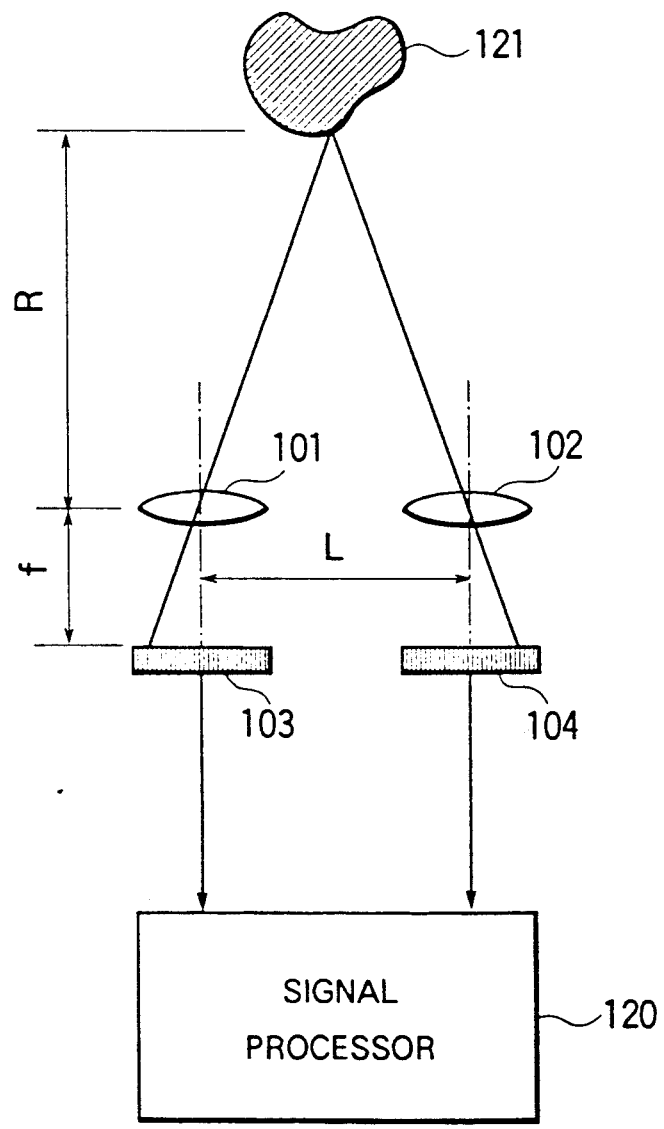
FIG. 3 is a schematic block diagram of a conventional distance measuring apparatus.

As a result, a value of k which minimizes the total sum $S_k$ of equation (1) above is obtained. Using this value of k as well as the difference between p−k, the microcomputer 8 calculates the distance R to the preceding vehicle in the same manner as described with reference to FIG. 3.

Thereafter, the image signals in the first memory 5 are transferred to the third memory 7. Then, as depicted in FIG. 2(c), at a point in time $t_1$ after a predetermined time from the first mentioned time point $t_0$, image signals are read out from the first and second memories 5, 6. At this time, since the third memory 7 stores the image 16 as sensed by the first image sensor 3 at time $T_0$ whereas the first memory 5 stores the image 16' sensed by the first image sensor 3 at time $t_1$, the location of the target vehicle which is running ahead of the subject vehicle at time $t_1$ can be determined by searching the first memory 3 for an image which is the most similar to the image 16 of the preceding vehicle at time $t_0$ with the window in the third memory 7 being taken as a reference.

Specifically, assuming that picture elements or image signals within the window 15 at time $t_0$ are represented by $S_{i,j}$ [i varies from p to (p+r), and j varies from q to (q+s)], and that corresponding image signals in the first images at time $T_1$ are represented by $SII_{i,j}$, then a total sum $S_{k,l}$ of absolute values of differences between the image signals $SII_{i,j}$ at time $t_0$ and the image signals $S_{i,j}$ at time $t_1$ is expressed as follows:

$$S_{k,l} = \sum_{j=p}^{q+s} \sum_{i=P}^{P+r} |SII_{i,j} - S_{i+k,j+l}| \quad (2)$$

The image processor 7 calculates equation (2) above while successively changing or incrementing the values of k and l one by one. An image-following window is then set by employing the specific values of k and l which minimize the total sum $S_{k,l}$. That is, the window is set such that the lower left-hand corner of the window is a point (p+k, q+l) and the upper right-hand corner is a point (p+k+r, q+l+s), so the locations of picture elements inside the thus set window are represented by (i, j) wherein i takes a value from (p+k) to (p+k+r), and j takes a value from (q+l) to (q+l+s).

In particular, in cases where the object to which the distance is to be measured is a vehicle, the profile of the vehicle generally includes many horizontal lines, which can be extracted from the images as sensed by the image sensors 3, 4 for properly correcting or adjusting the position of the window for improved accuracy in following the target preceding vehicle. To this end, using a provisional window as set in the above manner, differences between vertically adjacent image signals within said provisional window are summed up over the horizontal length of the provisional window to extract horizontal lines in the provisional window, so that a new window is defined based on a vertical position maximizing the sum of the differences.

For example, a total sum $S_a$ of differences between vertically adjacent image signals $S_{n,a}$, $S_{n,a-1}$ within an upper half of the provisional window and a total sum $S_b$ of differences between vertically adjacent images $S_{n,b}$, $S_{n,b-1}$ within a lower half of the provisional window are calculated based on the following equations:

$$Sa = \sum_{n=P+k}^{P+k+r} (Sn,a - Sn,a-1)$$

where $q+l+s/2 < a < q+l+s$.

$$Sb = \sum_{n=P+k}^{P+k+r} (Sn,b - Sn,b-1)$$

where $q+l < b < q+l+s/2$.

Figure 2:
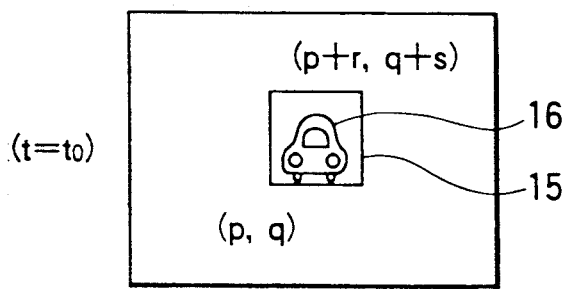
FIGS. 2(a) through 2(e) are explanatory views showing a procedure of following a preceding vehicle carried out by the vehicle following apparatus of FIG. 1.
Figure 2:
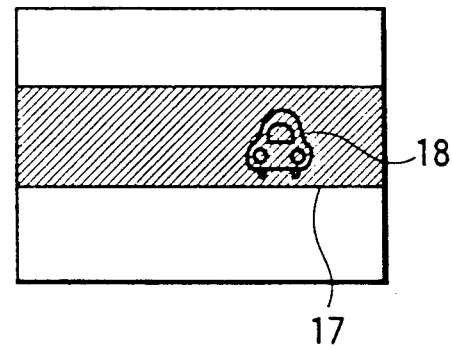
Figure 2:
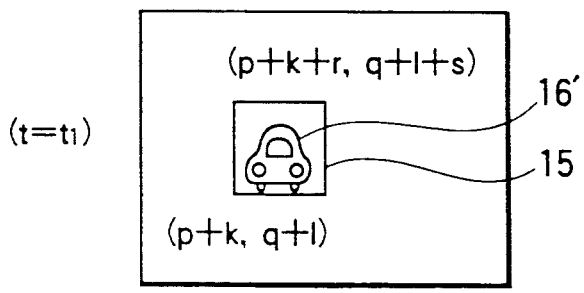
Figure 2:
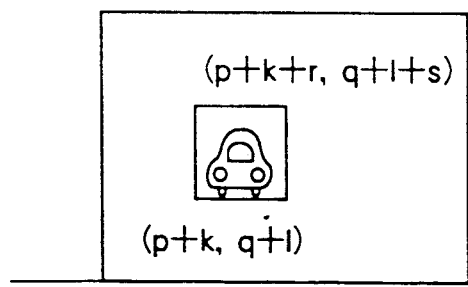
Figure 2:
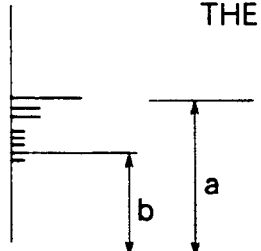
Figure 2:
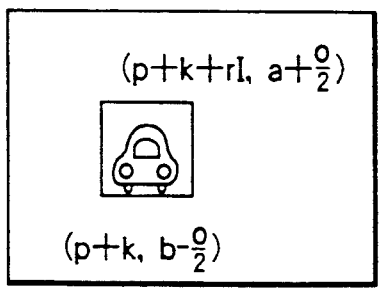

In addition, as shown in FIG. 2(d), based on the difference between the value of a, which maximizes $S_a$ for the upper half of the provisional window, and the value of b, which maximizes $S_b$ for the lower half of the provisional window, the vertical length sl and the horizontal length rl of a new window are determined as follows:

$$sl = a - b + o$$

$$rl = r + (sl - s)$$

where o is an offset. Thus, the new window of this size is freshly defined with the lower left-hand corner and the upper right-hand corner thereof being located at points (p+k, b−o/2) and (p+k+rl, a+o/2), respectively. In this manner, a new window can be defined in a reliable manner which contains in the center thereof an image of an object such as a vehicle having many horizontal lines.

By setting the window at time $t_1$ in this manner, the distance to the target preceding vehicle can be detected based on the first and second (or left-hand and right-hand) images. Repeating the above-described procedure, the distance to the preceding vehicle can successively be measured while following it.

Although in the above description, the pair of first and second optical systems are disposed in a horizontally spaced relation with respect to each other, they may be otherwise disposed with substantially the same results. For example, they can be disposed in a vertically spaced relation with respect to each other in which their base line connecting between the centers of the first and second optical systems is perpendicular to the horizontal, or they can also be disposed in an obliquely spaced relation in which their base line is inclined at an arbitrary angle relative to the horizontal.

In addition, although in the above description, the pair of separate image sensors 3, 4 are employed, they may be a single image sensor having an imaging area divided into two.

What is claimed is:

1. A vehicle following apparatus with a distance measuring function comprising:
    image sensor means for imaging an object from two different points to form a pair of first and second images thereof;
    window forming means for defining a vehicle-following window of a variable size within said first images;
    a memory for successively storing an image in said vehicle-following window;
    an image processor for finding, from said first images at a current time, a new image which is the most similar to the image stored in said memory at a previous time, said image processor being operable to define a provisional window containing therein the thus found new image; and
    a controller for calculating the distance to the preceding vehicle based on the distance of shift by which the new image in said first images is shifted relative to a corresponding image in said second images to obtain the best match therebetween, said controller being operable to adjust the location of said provisional window to form a new window so that the new window thus formed contains the most number of horizontal lines.

2. A vehicle following apparatus according to claim 1, wherein said image processor finds the new image using a total sum $S_{k,l}$ of absolute values of differences between the image signals $SII_{i,j}$ stored in said memory at a previous time $t_0$ and the corresponding image signals $S_{i,j}$ in said first images at the current time $t_1$, the new image being determined by a minimum value for the total sum.

3. A vehicle following apparatus according to claim 2, wherein said total sum $S_{k,l}$ is expressed by the following equation:

$$S_{k,l} = \sum_{j=q}^{q+s} \sum_{i=P}^{P+r} |SII_{i,j} - S_{i+k,j+l}|$$

where $S_{i,j}$ is an image signal at a location (i, j) in said first images at time $t_1$ [i.e., i varies from p to (p+r), and j varies from q to (q+s)], and $SII_{i,j}$ is an image signal at a location (i, j) within said window at time $t_0$.

4. A vehicle following apparatus according to claim 3, wherein said image processor sets said provisional window of a rectangular configuration such that the lower left-hand corner of said window is a point (p+k, q+l) and the upper right-hand corner thereof is a point (p+k+r, q+l+s).

5. A vehicle following apparatus according to claim 1, wherein using said provisional window, differences between vertically adjacent image signals within said provisional window are summed up over the horizontal length of said provisional window to extract horizontal lines in said provisional window, so that said new window is defined based on a vertical position maximizing the sum of the differences.

6. A vehicle following apparatus according to claim 5, wherein a total sum $S_a$ of differences between vertically adjacent image signals $S_{n,a}$, $S_{n,a-1}$ within an upper half of said provisional window and a total sum $S_b$ of differences between vertically adjacent images $S_{n,b}$, $S_{n,b-1}$ within a lower half of said provisional window are calculated based on the following equations:

$$Sa = \sum_{n=P+k}^{P+k+r} (S_{n,a} - S_{n,a-1})$$

where $q+l+s/2 < a < q+l+s$;

$$Sb = \sum_{n=P+k}^{P+k+r} (S_{n,b} - S_{n,b-1})$$

where $q+l < b < q+l+s2$;

and based on the difference between the value of a, which maximizes $S_a$, and the value of b, which maximizes $S_b$, the vertical length sI and the horizontal length rI of said new window are determined as follows:

$$sI = a - b + o$$

$$rI = r + (sI - s)$$

where o is an offset of said new window from said provisional window; and said new window of this size is freshly defined with the lower left-hand corner and the upper right-hand corner thereof being located at points (p+k, b−o/2) and (p+k+rI, a+o/2), respectively.

* * * * *